(12) United States Patent
Lee

(10) Patent No.: US 11,546,317 B2
(45) Date of Patent: *Jan. 3, 2023

(54) SYSTEMS AND METHODS FOR PROVIDING SERVICES

(71) Applicant: Comcast Cable Communications, LLC, Philadelphia, PA (US)

(72) Inventor: Yiu L. Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,784

(22) Filed: May 18, 2021

(65) Prior Publication Data

US 2022/0109664 A1  Apr. 7, 2022

Related U.S. Application Data

(63) Continuation of application No. 16/397,886, filed on Apr. 29, 2019, now Pat. No. 11,044,241, which is a continuation of application No. 15/274,561, filed on Sep. 23, 2016, now Pat. No. 10,327,138, which is a continuation of application No. 13/785,820, filed on Mar. 5, 2013, now Pat. No. 9,479,489.

(51) Int. Cl.

| *H04L 29/06* | (2006.01) |
| *H04L 9/40* | (2022.01) |
| *H04W 12/08* | (2021.01) |
| *H04W 12/06* | (2021.01) |

(52) U.S. Cl.
CPC .......... *H04L 63/08* (2013.01); *H04L 63/0853* (2013.01); *H04L 63/10* (2013.01); *H04W 12/06* (2013.01); *H04W 12/08* (2013.01)

(58) Field of Classification Search
CPC ..... H04L 63/08; H04L 63/0853; H04L 63/10; H04W 12/06; H04W 12/08
See application file for complete search history.

(56) References Cited

U.S. PATENT DOCUMENTS

| 5,841,670 A | 11/1998 | Swoboda |
| 6,167,438 A | 12/2000 | Yates et al. |
| 6,507,854 B1 | 1/2003 | Dunsmoir et al. |
| 6,892,230 B1 | 5/2005 | Gu et al. |
| 7,797,016 B2 | 9/2010 | Eran et al. |
| 7,826,381 B1 * | 11/2010 | Kastuar ............... H04L 12/4641 370/242 |
| 7,983,888 B2 | 7/2011 | Evoy et al. |
| 8,108,494 B1 | 1/2012 | Holland et al. |
| 8,117,340 B2 | 2/2012 | Williams et al. |
| 8,332,905 B2 | 12/2012 | Jenkin et al. |
| 8,843,600 B1 | 9/2014 | Gabrielson et al. |
| 9,479,489 B2 | 10/2016 | Lee |
| 10,327,138 B2 | 6/2019 | Lee |

(Continued)

OTHER PUBLICATIONS

Carson et al. "NIST Net: a Linux-based network emulation tool." ACM SIGCOMM Computer Communication Review 33.3 (2003): 111-126.

(Continued)

*Primary Examiner* — Chau Le
(74) *Attorney, Agent, or Firm* — Ballard Spahr LLP

(57) ABSTRACT

Systems and methods for providing one or more services to a device are disclosed. The device may be remote from a first network. The one or more services may be associated with the first network.

21 Claims, 6 Drawing Sheets

(56) References Cited

U.S. PATENT DOCUMENTS

| | | |
|---|---|---|
| 2006/0245403 A1* | 11/2006 | Kumar ............... H04L 12/2836 |
| | | 370/338 |
| 2007/0203970 A1 | 8/2007 | Nguyen |
| 2007/0288632 A1 | 12/2007 | Kanaparti et al. |
| 2008/0155537 A1 | 6/2008 | Dinda et al. |
| 2008/0279161 A1 | 11/2008 | Stirbu et al. |
| 2009/0036111 A1 | 2/2009 | Danford et al. |
| 2009/0259515 A1* | 10/2009 | Belimpasakis ........ G06Q 30/02 |
| | | 709/218 |
| 2010/0057919 A1 | 3/2010 | Leitheiser et al. |
| 2010/0153237 A1 | 6/2010 | LaJoie et al. |
| 2010/0263682 A1 | 10/2010 | White |
| 2011/0252466 A1 | 10/2011 | Le Saint et al. |
| 2012/0030701 A1 | 2/2012 | Xiong et al. |
| 2012/0317236 A1 | 12/2012 | Abdo et al. |
| 2013/0091551 A1 | 4/2013 | Rajakarunanayake et al. |
| 2013/0166703 A1 | 6/2013 | Hammer et al. |
| 2013/0171973 A1 | 7/2013 | Zellner et al. |
| 2014/0026187 A1 | 1/2014 | Johnson et al. |
| 2014/0259144 A1 | 9/2014 | Lee |
| 2017/0111790 A1 | 4/2017 | Lee |

OTHER PUBLICATIONS

Zheng, et al. "EMWIN: emulating a mobile wireless network using a wired network." Proceedings of the 5th ACM International workshop on Wireless mobile multimedia. ACM, 2002.

* cited by examiner

SYSTEMS AND METHODS FOR PROVIDING SERVICES

CROSS REFERENCE TO RELATED APPLICATION

This application is a continuation of U.S. application Ser. No. 16/397,886 filed Apr. 29, 2019, which is a continuation of U.S. application Ser. No. 15/274,561 filed Sep. 23, 2016, issued as U.S. Pat. No. 10,327,138, which is a continuation of U.S. application Ser. No. 13/785,820 filed Mar. 5, 2013, issued as U.S. Pat. No. 9,479,489, which are herein incorporated by reference in their entireties.

BACKGROUND

Multiple devices may be connected to the same local area network (LAN) to access services. Devices may request available services from service providers. Such a configuration, however, may prevent a device from directly accessing available services from a location outside the LAN. These and other shortcomings will be addressed by the present disclosure.

SUMMARY

It is to be understood that both the following general description and the following detailed description are exemplary and explanatory only and are not restrictive, as claimed. Disclosed are methods and systems for providing services. In an aspect, services can be provided to a remote device.

In an aspect, a service element can be configured to collect information relating to available services at a first location or network (e.g., LAN). The information relating to available services can be sent to a discovery element, which may be any type of computing device or software. When a user (e.g., remote user) wants to access one or more of the available services, a user element, such as a client element, on a remote device can transmit a "discover" request to the discovery element to request the information relating to available services. Upon successful discovery, the discovery element can transmit (e.g., broadcast, unicast, multicast, stream, etc.) available services to the remote device and/or elements in communication with the remote device. When the discovery element receives a request for a particular service from the remote device, the discovery element can serve as a proxy and forward the request to the service element on behalf of the remote device. The service element can locally access the requested service(s) on behalf of the client element and the requested services can be routed to the remote device. As an example, the remote device can access services as if the remote device was disposed locally relative to the first location.

In an aspect, methods comprise identifying one or more services available at a location. Identification data relating to the one or more identified services can be transmitted, for example, to a device disposed remotely from the location. A selection of the one or more services available can be received and the selected one or more services available can be provided to the remote device.

In another aspect, methods comprise receiving identification data at a remote device disposed at a first location. The identification data can identify one or more services available via a gateway device disposed at a second location. A selection of the one or more services available can be received. The remote device can be configured to emulate the gateway device at the second location, wherein the remote device provides the selected one or more services available. The gateway device and the remote device can be coupled to the same or different networks.

In a further aspect, systems can comprise a first device in communication with a network. The first device can be configured to identify one or more services available via the network. The first device can be configured to transmit identification data relating to the one or more services available via the network. A second device can be in communication with the first device and disposed outside the network. The second device can be configured to receive the identification data. The second device can be configured to authenticate one or more remote devices and transmit the identification data to the one or more authenticated remote devices, wherein the identification data facilitates the configuration of the one or more authenticated remote devices to provide the one or more services available at the one or more authenticated remote devices. As an example, the first device can transmit the one or more service available to the remote device without routing through the second device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
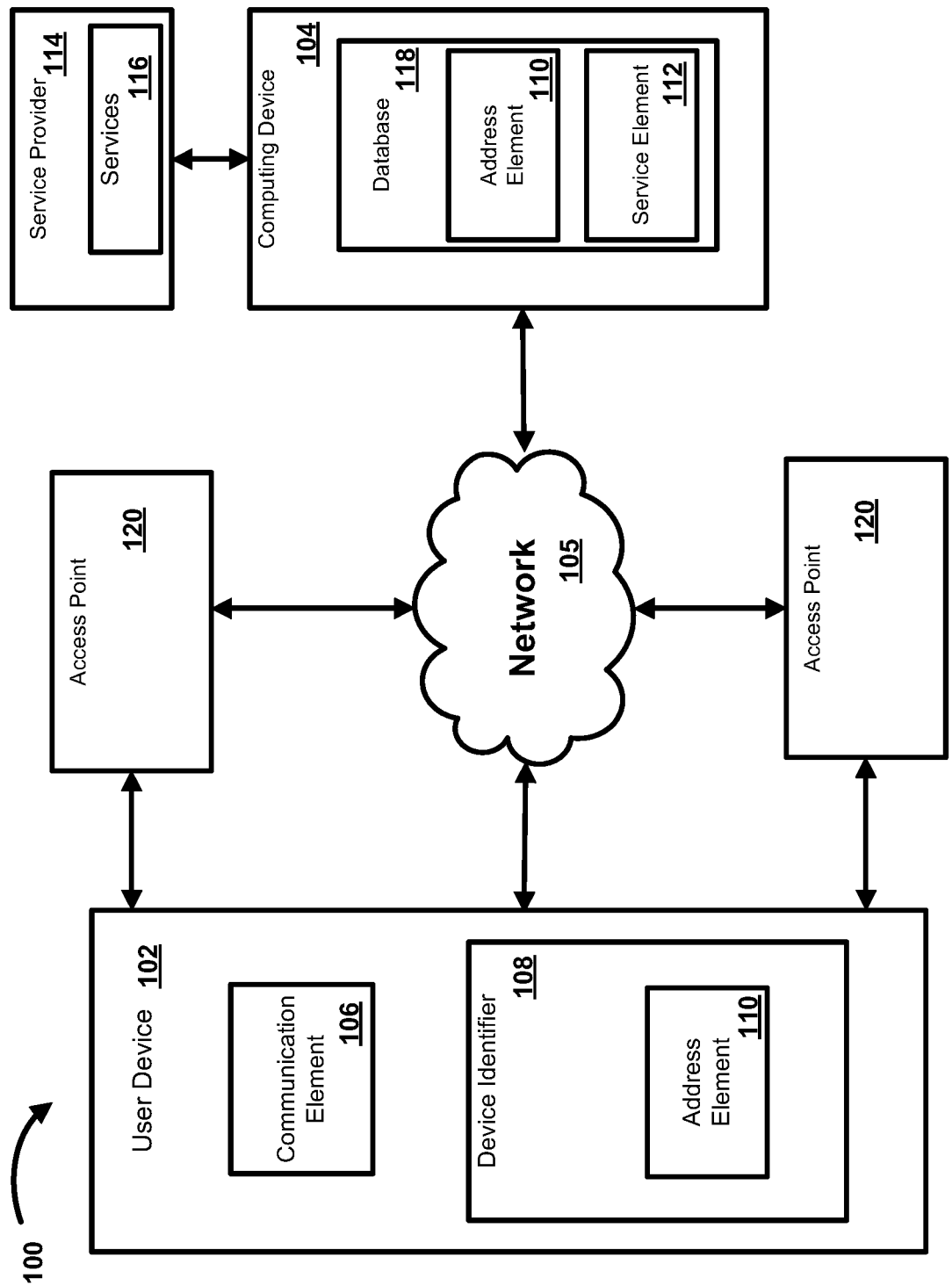
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In one aspect of the disclosure, a system can be configured to provide services such as media-related services to a remote user device. In an aspect, one or more services available at a local network can be provided via the remote device as if the remote device was a local device relative to the local network. As an example, the remote device can be configured to establish a proxy to the network. As a further example, the remote device can provide one or more services to a remote recipient substantially as if the remote recipient was disposed at the first location.

As an example, services such as local media server, a content tuner, IP video, and the like can be available on a local network (e.g., home network). As a further example, a remote device can discover the services available on the local network can be configured to access the service as if the remote device was locally joined to the local network. As such, the services can recognize the remote device as if the remote device was a local device.

FIG. 1 illustrates various aspects of an exemplary network in which the present methods and systems can operate. The present disclosure is relevant to systems and methods for providing services to a user device, for example. Those skilled in the art will appreciate that the present methods may be used in various types of networks and systems that employ both digital and analog equipment. One skilled in the art will appreciate that provided herein is a functional description and that the respective functions can be performed by software, hardware, or a combination of software and hardware.

The network 100 can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback, such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, a service element 112 can comprise and/or determine an identification of a service provider 114 associated with one or more of the user device 102 and the computing device 104. As an example, the service element 112 can comprise information relating to or provided by a communication service provider (e.g., Internet service provider) that is providing or enabling one or more services 116 to the computing device 104. As another example, the service element 112 can comprise information relating to a preferred service provider (e.g., service provider 114) for one or more particular services 116 relating to the user device 102. As another example, the service element 112 can comprise software, virtual elements, computing devices, network devices, communication hardware, a combination thereof, and/or the like. As a further example, the computing device 104 can provide services such as printing, media management (e.g., media server), content services, streaming services, digital living network alliance (DLNA) enabled services, or other services.

In an aspect, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server, gateway, network device, router, access point, customer premises equipment and the like for communicating with the user device 102. As an example, the computing device 104 can communicate with the user device 102 for providing services to the user device 102. In an aspect, the computing device 104 can allow the user device 102 to interact with remote resources such as data, devices, and files. As an example, the computing device 104 can be configured as a network gateway device, which can receive content (e.g., data, input programming) from multiple sources such as a central location, a headend, processing facility, service provider 114, or a combination thereof. The computing device 104 can combine the content from the various sources and can distribute the content to user (e.g., subscriber) locations via a distribution system, network, private network, or communication channel, or a combination thereof.

In an aspect, the computing device 104 can manage the communication between the user device 102 and a database 118 for sending and receiving data therebetween. As an example, the database 118 can store a plurality of files (e.g., web pages), user identifiers or records, or other information. As a further example, the user device 102 can request and/or retrieve a file from the database 118. In an aspect, the database 118 can store information relating to the user device 102, the address element 110, and/or the service element 112. As an example, the computing device 104 can obtain the device identifier 108 from the user device 102 and retrieve information from the database 118 such as the address element 110 and/or the service elements 112. As a further example, the computing device 104 can obtain the address element 110 from the user device 102 and can retrieve the service element 112 from the database 118, or vice versa. Any information can be stored in and retrieved from the database 118. The database 118 can be disposed remotely from the computing device 104 and accessed via direct or indirect connection. The database 118 can be integrated with the computing system 104 or some other device or system.

In an aspect, one or more access points 120 can be in communication with a network, such as network 105. As an example, one or more of the access points 120 can facilitate the connection of a device, such as user device 102, to the network 105. As a further example, one or more of the access points 120 can be configured as a wireless access point (WAP). In an aspect, one or more access points 120 can be configured to allow one or more wireless devices to connect to a wired and/or wireless network using Wi-Fi, Bluetooth, or similar standard.

Figure 2:
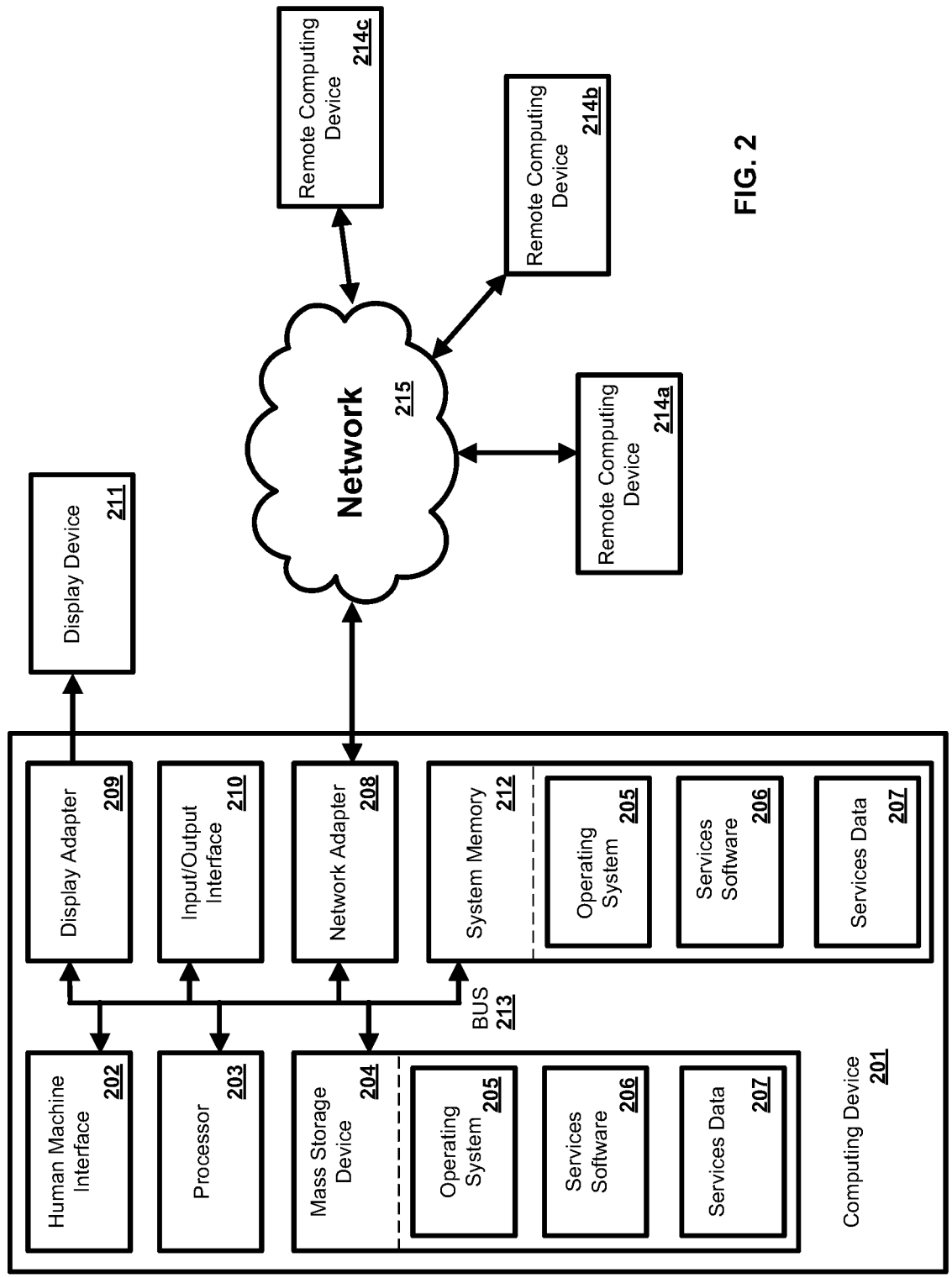
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, services software 206, services data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as services data 207 and/or program modules such as operating system 205 and services software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and services software 206. Each of the operating system 205 and services software 206 (or some combination thereof) can comprise elements of the programming and the services software 206. Services data 207 can also be stored on the mass storage device 204. Services data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of services software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

Figure 3:
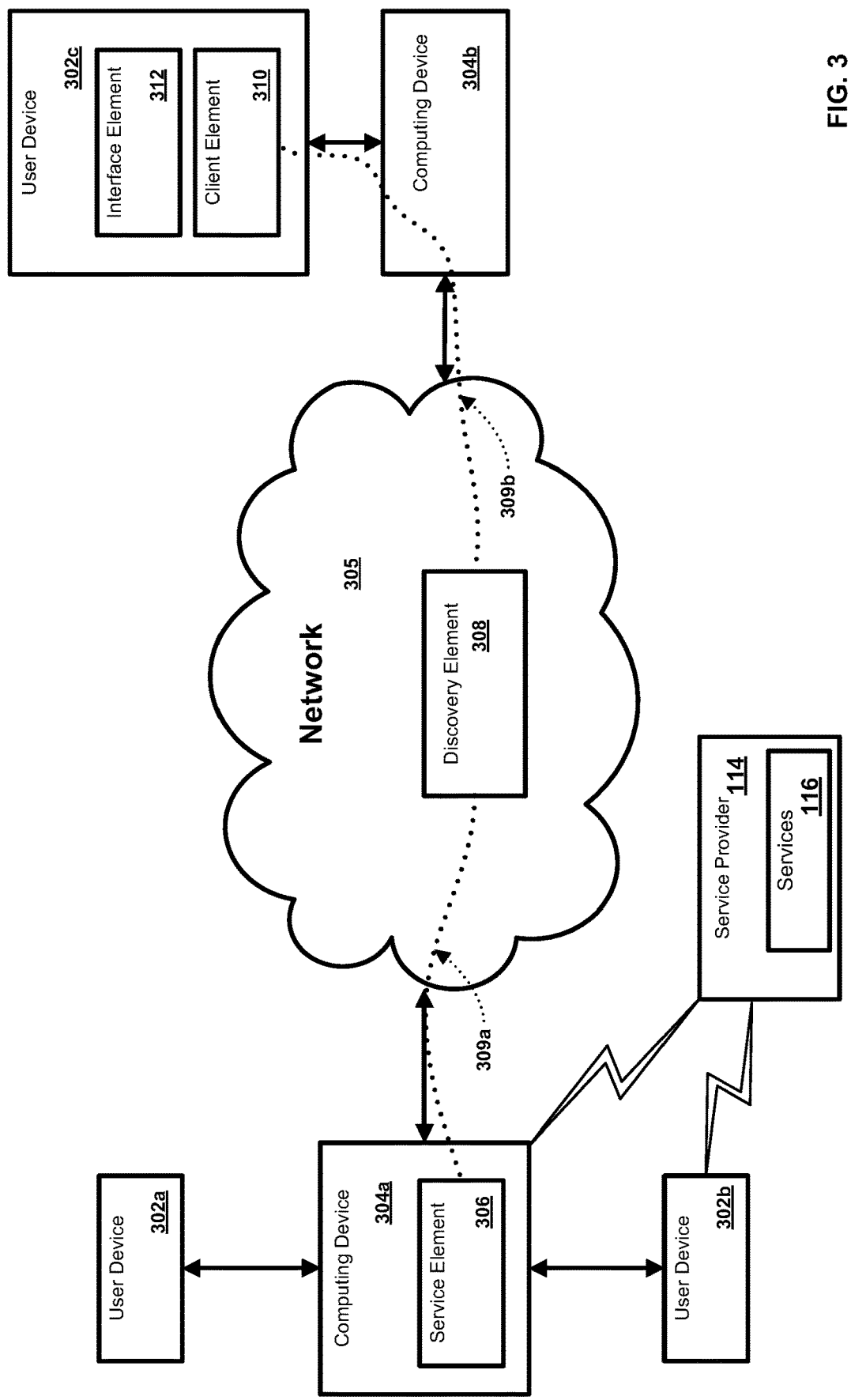
FIG. 3 is a diagram of an exemplary system and network.

FIG. 3 illustrates an exemplary system and network. In an aspect, one or more user devices 302a, 302b, 302c and one or more computing devices 304a, 304b can be in communication with one or more of each other. As an example, one or more of the user devices 302a, 302b, 302c and one or more of the computing devices 304a, 304b can be in communication with a network 305, such as the Internet, a private network, a public network, or the like. As an example, one or more of the user devices 302a, 302b, 302c can be an electronic device such as a computer, a smartphone, a laptop, a tablet, a set top box, a display device, or other device capable of receiving services 116 from a provider such as service provider 114. As a further example, one or more of the computing devices 304a, 304b can be a gateway, router, switch, communication device terminal server, cable modem, cable modem termination system, or customer premises equipment, or a combination thereof.

In an aspect, one or more of the computing devices 304a, 304b can be configured to identify one or more services (e.g., services 116) available via the one or more of the computing devices 304a, 304b. As an example, the one or more of the computing devices 304a, 304b can be in communication with a local network such as a LAN, wireless LAN, or the like to receive and or transmit services to/from other devices.

In an aspect, a service element 306 (e.g., service element 112 (FIG. 1)) can be configured to determine one or more of services available to the one or more of the computing devices 304a, 304b and/or to devices connected to the same network as the service element 306. As an example, the service element 306 can be configured to determine network statistics and available method(s) (e.g., L2VPN, L3VPN, Internet) to connect to the network. The service element 306 can be configured to perform any number of functions, such as monitoring the services that are available on a particular network; providing notification of service changes; report location (e.g., IP address); accept service initiation from remote elements; or act as a proxy for service initiation to a local service so that the local service recognizes the request as a local network request rather than remote location request; or a combination thereof.

In an aspect, one or more of the user devices 302a, 302b and/or the computing device 304a can be part of the same LAN. As an example, the computing device 304a can be configured as a network gateway device for the one or more of the user devices 302a, 302b. Accordingly, the service element 306 can be configured to determine an identification of the service provider 114 associated with the one or more of the user devices 302a, 302b connected to the same LAN as the computing device 304a.

In an aspect, the service element 306 can be configured to generate identification data representing information such as the identification of the service provider(s) 114 servicing a particular location and/or the services 116 available at a particular location. As an example, the identification data can comprise encoded data. As a further example, the identification data can comprise addressable information relating to the one or more services available.

In an aspect, the service element 306 can be configured to transmit the identification data, for example, to one or more elements of the network 305. As an example, a discovery element 308 can be configured to receive the identification data from one or more service elements 306. As another example, the discovery element 308 can be configured as part of the network 305. As a further example, the service element 306 can communicate with the discovery element 308 via one or more communication channels 309a such a network link, a multicast discovery link, or other link or path to facilitate communication of data.

In an aspect, the discovery element 308 can be configured to receive one or more of a location (e.g., IP address), an identification of available services, supported remote connection methods, and network statistics (e.g., latency and bandwidth availability) from the service element 306. In another aspect, the discovery element 308 can be configured to authenticate users and/or devices such as device requesting services identified by the service element 306.

In an aspect, one or more devices, such as user device 302c can be disposed outside the LAN comprising the user device 302a, 302b. As an example, the user device 302c can be disposed in a remotely from the location of one or more of the user devices 302a, 302b.

In an aspect, the user device 302c and/or the computing device 304a can be part of the same LAN. As an example, the computing device 304a can be configured as a network gateway device or access point for the user device 302c. Accordingly, user device 302c can be configured to communicate with the network 305.

In an aspect, the user device 302c can request authentication for access to a particular service such as services 116. As an example, the user device 302c can request authentication from the discovery element 308. As another example, the discovery element 308 can transmit data to the user device 302c, such as the identification data generated by the service element 306. As a further example, the discovery element 308 can transmit updates relating to changes to services available at the service element 306 and/or the identification data generated by the service element 306.

In an aspect, a user element such as client element 310 can be configured to receive one or more of a location (e.g., IP address), an identification of available services, supported remote connection methods, and network statistics (e.g., latency and bandwidth availability) from one or more of the service element 306 and the discovery element 308. As an example, one or more user elements such as client elements 310 can be configured to communicate with one or more discovery elements 308. As a further example, the client element 310 can communicate with the discovery element 308 via one or more communication channels 309b. In another aspect, the client element 310 can be configured to authenticate users and/or devices, such as device requesting services identified by the service element 306. As an example, the client element 310 can be configured to request authentication from the discovery element 308.

In an aspect, a user element such as client element 310 can be configured as a logical function comprised in the user device 302c or an interface element 312 of the user device 302c. As an example, the interface element 312 can be a logical element, such as software configured to facilitate the delivery of services to a user. As a further example, when a remote user desires to access services available at a first location (e.g., premises, home, office, location remote from user's location), the user can activate the client element 310. The client element 310 can query the discovery element 308 for services information. As an example, the query can comprise a user identifier and credentials to facilitate authentication of the user request. Based on the query by the client element 310, the discovery element 308 can transmit services data such as identification data to the client element 310. As such, the client element 310 can selectively provide (e.g., transmit, broadcast, multicast, present, etc.) services information to the user device 302c and/or the interface element 312.

In an aspect, when the client element 310 provides the services information to the user device 302c and/or the interface element 312, the user device 302c and/or the interface element 312 can process the services information to facilitate the receipt of service available at a remote location. As an example, the client element 310 can facilitate the emulation of the computing device 304a at a remote location. As a further example, the client element 310 can establish a connection to the service element 306 and can act as a proxy for providing the services. In an aspect, the client element 310 can act as a proxy to transmit discovery messages to the interface element 312 and/or the user device 302c or other devices.

Figure 4:
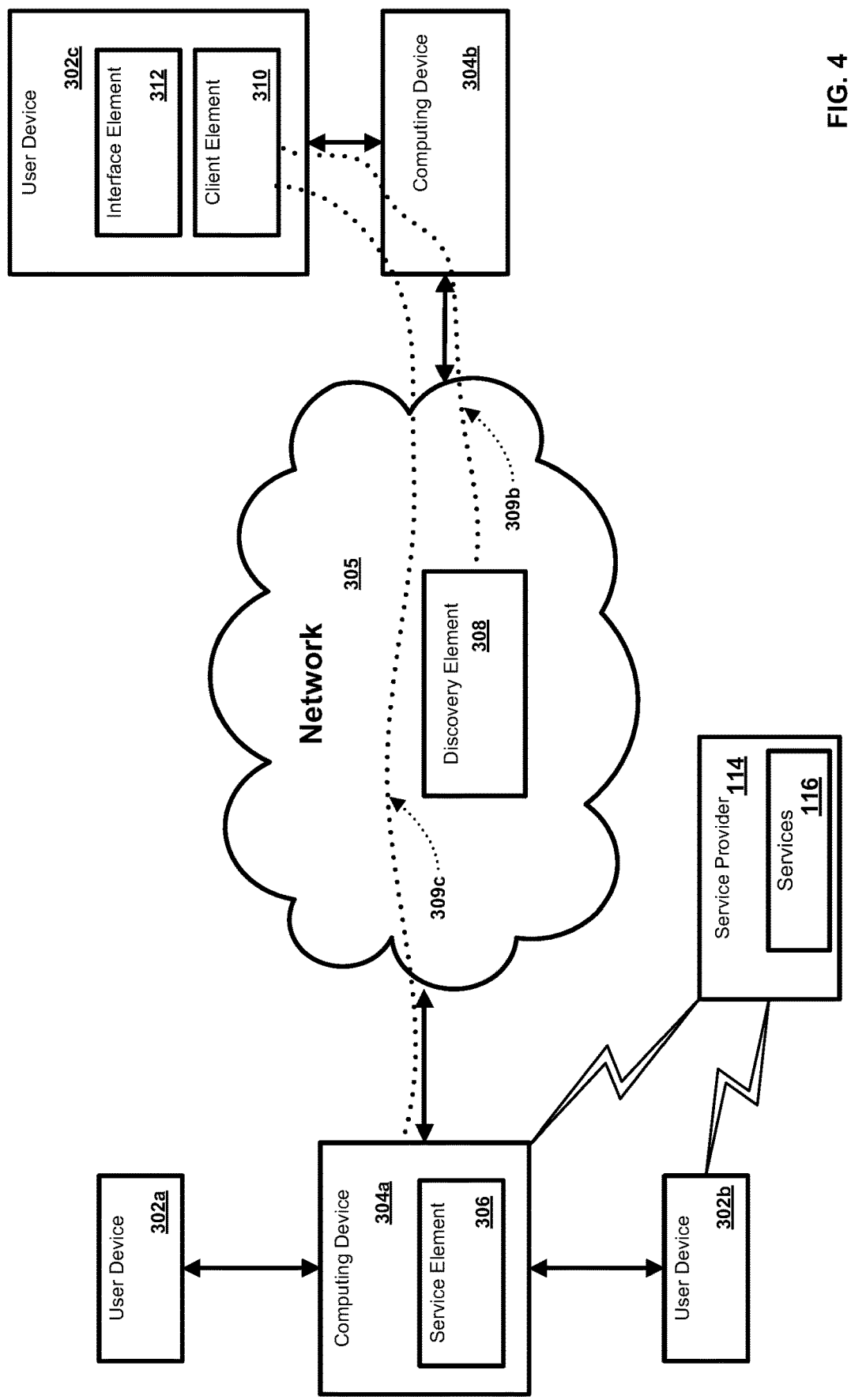
FIG. 4 is a diagram of an exemplary system and network.

As an example, as illustrated in FIG. 4, when the service element 306 receives requests/queries from a user element such as the client element 310, the service element 306 can request one or more services 116 from the service provider 114 and/or the user devices 302a, 302b on behalf of the client element 310. From the perspective of the service provider 114 and/or the user devices 302a, 302b, the request for services can be perceived as a local request such as by a device on the LAN. The service element 306 can provide connection information to the client element 310. Accordingly, the user device 302c and/or the interface element 312 can access the service available at the computing device 304a or the LAN associated with the computing device 304a. As an example, the user device 304b and/or the interface element 312 can access the available service via the network 305, a communication channel 309c such as a virtual private network, or via the client element 310, or a combination thereof.

Figure 5:
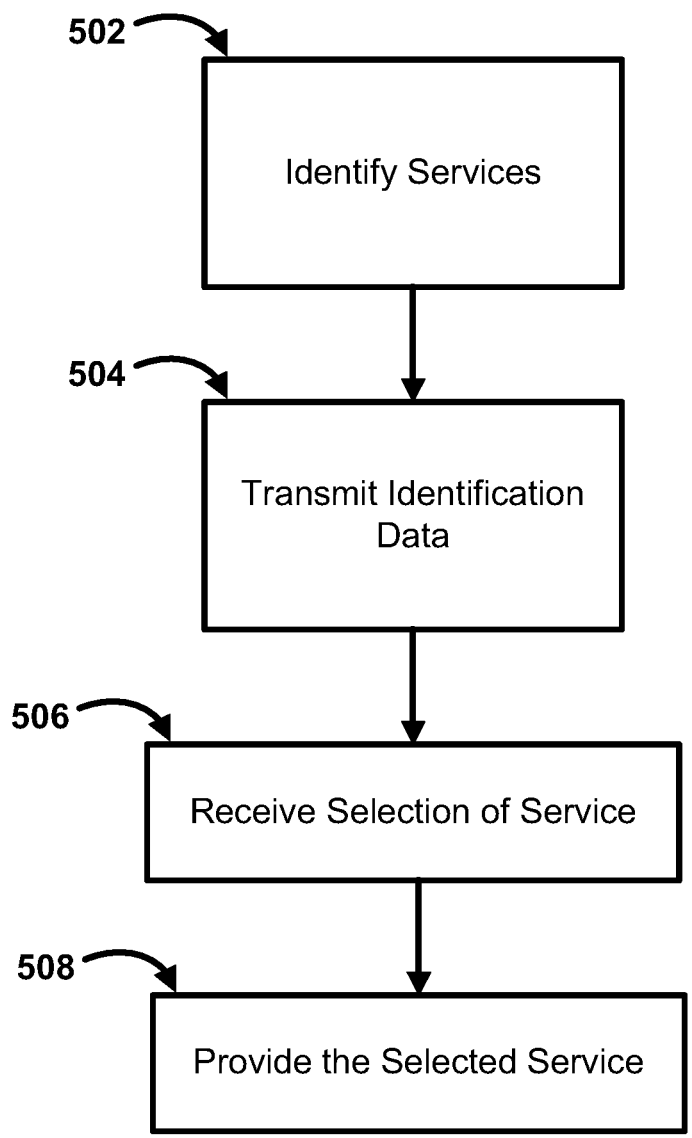
FIG. 5 is a flow chart of an exemplary method.

An exemplary method for providing one or more local services to a remote device is shown in FIG. 5. In step 502, one or more services available at a location can be identified. As an example, identifying the one or more services available can comprise receiving multicast discovery information. As a further example, identifying the one or more services available can comprises receiving information transmitted to a dedicated Internet Protocol address.

In step 504, identification data can be transmitted to a remote device disposed remotely from the location. In an aspect, the identification data can relate to the one or more services identified. As an example, the identification data can comprises encoded data. As another example, the identification data can comprise addressable information relating to the one or more services. As a further example, the remote device can be authenticated prior to transmitting identification data to the remote device.

In step 506, a selection of the one or more services available can be received. In an aspect, receiving a selection of the one or more services available can comprise receiving a user-provided input representing the selection of the one or more services.

In step 508, the selected one or more services available can be provided to the remote device. As an example, providing the selected one or more services available to the remote device can comprise establishing a virtual network between the remote device and the first network. As a further example, providing the selected one or more services available to the remote device can comprise establishing the remote device as a proxy to the first network.

Figure 6:
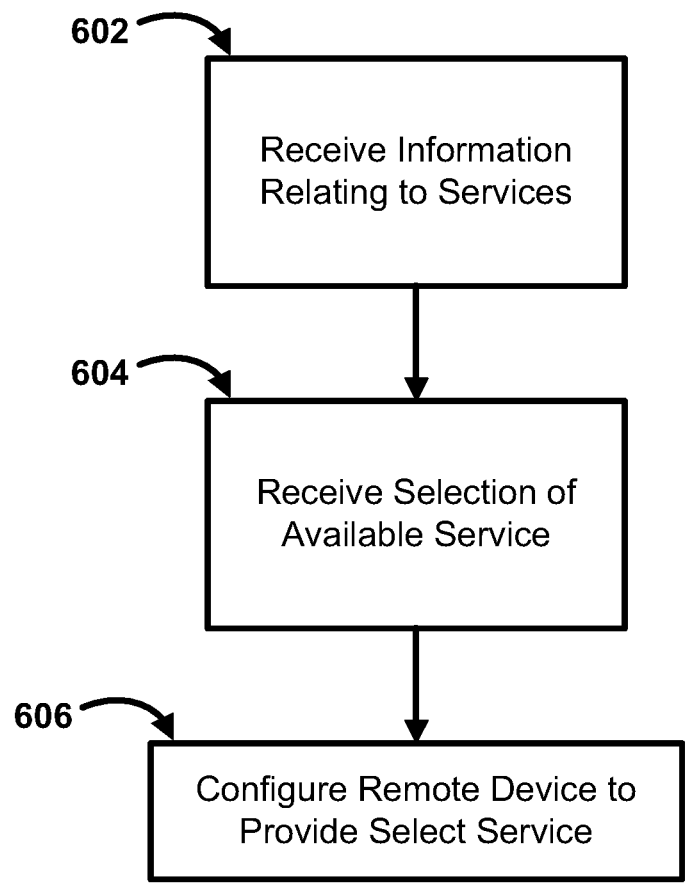
FIG. 6 is a flow chart of an exemplary method.

In an aspect, FIG. 6 illustrates an exemplary method for providing one or more services via a remote device. In step 602, information relating to services can be received. In an aspect, information such as identification data can be received at a remote device disposed at a first location. As an example, the identification data can identify one or more services available. As a further example, the identification data can identify one or more services available via a gateway device disposed at a second location. In an aspect, the identification data can comprises encoded data and/or information relating to connecting to a gateway device. As an example, the identification data can comprise addressable information relating to the one or more services identified.

In step 604, a selection of the one or more services available can be received. In an aspect, receiving a selection of the one or more services available can comprise receiving a user-provided input representing the selection of the one or more services available.

In step 606, a remote device can be configured to provide services. In an aspect, the remote device can be configured to emulate the gateway device of the network. In another aspect, the remote device can provide the selected one or more services available as if the remote device was a local device. As an example, configuring the remote device can comprise establishing a virtual network between the remote device and the network. As another example, configuring the remote device can comprise establishing the remote device as a proxy to the network. As a further example, the remote device can provide the selected one or more services available to a remote recipient substantially as if the remote recipient was disposed at the first location.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving, by a second device, a discover request from a first device, wherein the first device is located in a first network, and wherein the first network is separate from a second network;
authenticating, based on the discover request, the first device;
sending, to the first device, encoded identification data, wherein the encoded identification data relates to one or more services available locally in the second network;
receiving, from the first device, an indication of a selected service of the one or more services; and
based on the indication, enabling the first device to access the selected service of the one or more services.

2. The method of claim 1, wherein the encoded identification data comprises one or more of: an internet protocol address for the one or more services, address information for the one or more services, or available service data.

3. The method of claim 1, further comprising determining, based on multicast discovery information, that the one or more services are available locally in the second network.

4. The method of claim 1, wherein the one or more services comprise one or more media management services provided on the second network by a third device.

5. The method of claim 1, further comprising:
causing a network address for the second network to be assigned to the first device; and
wherein the first device is configured, based on the network address, to emulate a third device for virtual inclusion of the first device in the second network.

6. The method of claim 1, wherein the second device is configured as a proxy for a third device.

7. The method of claim 1, wherein the one or more services comprises one or more of: digital living network alliance (DLNA) enabled services, printing services, media management services, content services, or streaming services.

8. A system comprising:
a second computing device located in a second network, wherein the second computing device is configured to:
receive a discover request from a first computing device, wherein the first computing device is located in a first network, and wherein the first network is separate from the second network;
authenticate, based on the discover request, the first computing device;
send, to the first computing device, encoded identification data, wherein the encoded identification data relates to one or more services available locally in the second network;
receive, from the first computing device, an indication of a selected service of the one or more services; and
based on the indication, enable the first computing device to access the selected service of the one or more services; and
the first computing device configured to:
send, to the second computing device, the discover request;
receive, from the second computing device, the encoded identification data; and
send, to the second computing device, the indication of the selected service of the one or more services.

9. The system of claim 8, wherein the encoded identification data comprises one or more of: an internet protocol address for the one or more services, address information for the one or more services, or available service data.

10. The system of claim 8, further comprising determining, based on multicast discovery information, that the one or more services are available locally in the second network.

11. The system of claim 8, wherein the one or more services comprise one or more media management services provided on the second network by a third computing device.

12. The system of claim 8, further comprising:
causing a network address for the second network to be assigned to the first computing device; and
wherein the first computing device is configured, based on the network address, to emulate a third computing device for virtual inclusion of the first computing device in the second network.

13. The system of claim 8, wherein the second computing device is configured as a proxy for a third computing device.

14. The system of claim 8, wherein the one or more services comprises one or more of: digital living network alliance (DLNA) enabled services, printing services, media management services, content services, or streaming services.

15. One or more non-transitory computer-readable media storing processor executable instructions that, when executed by one or more processors of a second device, causing the one or more processors to:
receive, by the second device, a discover request from a first device, wherein the first device is located in a first network, and wherein the first network is separate from a second network;
authenticate, based on the discover request, the first device;
send, to the first device, encoded identification data, wherein the encoded identification data relates to one or more services available locally in the second network;
receive, from the first device, an indication of a selected service of the one or more services; and
based on the indication, enable the first device to access the selected service of the one or more services.

16. The one or more non-transitory computer-readable media of claim 15, wherein the encoded identification data comprises one or more of: an internet protocol address for the one or more services, address information for the one or more services, or available service data.

17. The one or more non-transitory computer-readable media of claim 15, further comprising determining, based on multicast discovery information, that the one or more services are available locally in the second network.

18. The one or more non-transitory computer-readable media of claim 15, wherein the one or more services comprise one or more media management services provided on the second network by a third device.

19. The one or more non-transitory computer-readable media of claim 15, further comprising:
   causing a network address for the second network to be assigned to the first device; and
   wherein the first device is configured, based on the network address, to emulate a third device for virtual inclusion of the first device in the second network.

20. The one or more non-transitory computer-readable media of claim 15, wherein the second device is configured as a proxy for a third device.

21. The one or more non-transitory computer-readable media of claim 15, wherein the one or more services comprises one or more of: digital living network alliance (DLNA) enabled services, printing services, media management services, content services, or streaming services.

\* \* \* \* \*